(12) United States Patent
Nakamura et al.

(10) Patent No.: US 6,459,915 B2
(45) Date of Patent: Oct. 1, 2002

(54) EXTERNAL ADAPTER FOR A PORTABLE CELLULAR PHONE

(75) Inventors: Hiroyuki Nakamura, Neyagawa; Makoto Sakakura, Uji; Takaaki Maegawa, Sakurai; Hiroaki Kosugi, Hirakata; Kenichi Takahashi, Kawasaki, all of (JP)

(73) Assignee: Matsushita Electric Industrial Co. Ltd., Osaka (JP)

(*) Notice: Subject to any disclaimer, the term of this patent is extended or adjusted under 35 U.S.C. 154(b) by 0 days.

(21) Appl. No.: 09/162,619

(22) Filed: Sep. 29, 1998

(30) Foreign Application Priority Data

Sep. 2, 1997 (JP) ............................................. 9-264548

(51) Int. Cl.[7] ............................. H04B 1/38; H04M 1/00
(52) U.S. Cl. ........................ 455/571; 455/575; 455/574
(58) Field of Search ........................ 455/127, 90, 129, 455/557, 575, 572, 550, 571, 343, 89, 573, 574

(56) References Cited

U.S. PATENT DOCUMENTS

| | | | | |
|---|---|---|---|---|
| 4,684,870 A | * | 8/1987 | George et al. ................. 455/89 |
| 5,023,930 A | * | 6/1991 | Leslie .......................... 455/127 |
| 5,033,111 A | * | 7/1991 | Marui .......................... 455/127 |
| 5,109,541 A | | 4/1992 | Park | |
| 5,239,690 A | * | 8/1993 | Heinonen .................... 455/127 |
| 5,276,918 A | * | 1/1994 | Cornforthe et al. ......... 455/127 |
| 5,303,395 A | * | 4/1994 | Dayani ........................ 455/127 |
| 5,369,803 A | * | 11/1994 | Hirasawa et al. ............. 455/89 |
| 5,450,620 A | * | 9/1995 | Vaisanen ..................... 455/571 |
| 5,524,044 A | | 6/1996 | Takeda | |
| 5,551,067 A | * | 8/1996 | Hulkko et al. ................. 455/89 |
| 5,555,450 A | * | 9/1996 | Sointula ...................... 455/127 |
| 5,715,522 A | * | 2/1998 | Vimpari et al. .............. 455/571 |
| 5,995,813 A | * | 11/1999 | Ishikura et al. ............. 455/127 |

FOREIGN PATENT DOCUMENTS

| | | | | |
|---|---|---|---|---|
| JP | 402105636 A | * | 4/1990 | ................. 455/575 |
| JP | 5-347584 | | 12/1993 | |

* cited by examiner

Primary Examiner—Edward F. Urban
Assistant Examiner—Tilahun Gesesse
(74) Attorney, Agent, or Firm—Ratner & Prestia (57) ABSTRACT

A portable celullar phone apparatus includes a portable cellular phone and an external adapter for a portable cellular phone. It is possible to suppress an increase in output power of a portable cellular phone transmit amplifier due to a loss at a transmit switch associated with use of an external transmitting antenna by coupling a first output of the transmit switch to a portable cellular phone transmit amplifier and coupling a second output of the transmit switch to an input of a transmit amplifier part of a portable cellular phone external adapter. Deterioration of a NF of a receiving system due to a loss at a receive switch when using an external receiving antenna may be reduced by coupling a first input of a receive switch to a portable cellular phone receive amplifier and coupling a second input of the receive switch to an output of a receive amplifier part of the portable cellular phone external adapter.

19 Claims, 7 Drawing Sheets

EXTERNAL ADAPTER FOR A PORTABLE CELLULAR PHONE

BACKGROUND OF THE INVENTION

1. Field of the Invention

The present invention relates to a portable cellular phone and an external adapter which is used for a portable cellular phone.

2. Description of the Background Art

Figure 6:
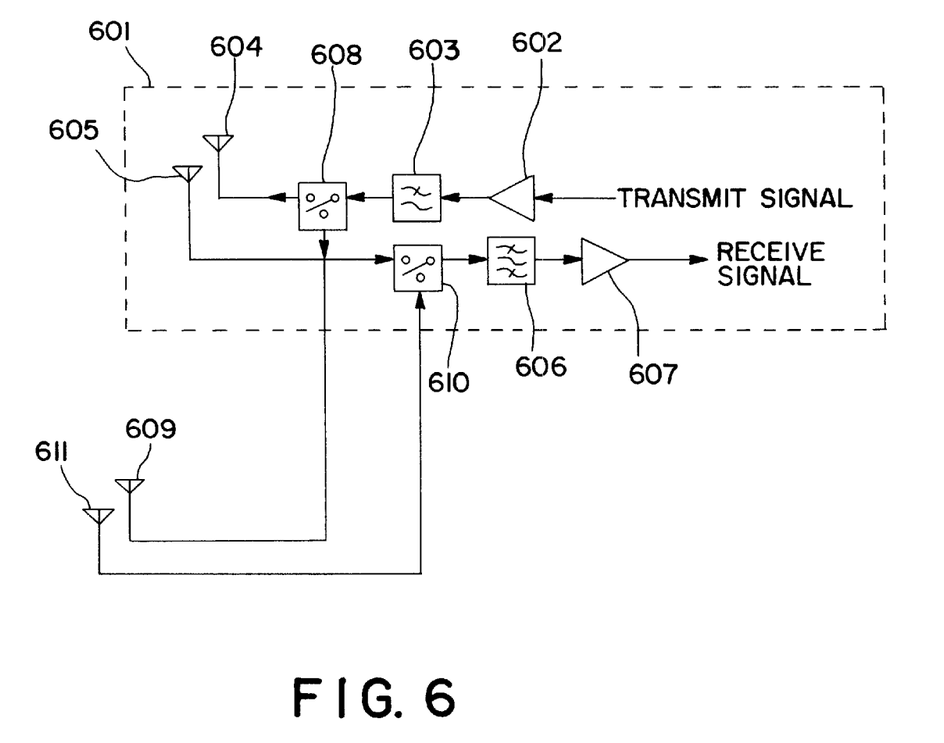
FIG. 6 is a block diagram showing a conventional portable cellular phone.

In a conventional portable cellular phone 601, as shown in FIG. 6, a transmit signal is radiated from a portable cellular phone transmitting antenna 604 through a portable cellular phone transmit amplifier 602 and a portable cellular phone transmit filter 603, and a receive signal is received at a portable cellular phone receiving antenna 605 and thereafter supplied to a portable cellular phone receive amplifier 607 through a portable cellular phone receive filter 606. A transmit switch 608 is disposed between the portable cellular phone transmit filter 603 and the portable cellular phone transmitting antenna 604, and is connected to an external transmitting antenna 609 as well. Further, a receive switch 610 is disposed between the portable cellular phone receiving antenna 605 and the portable cellular phone receive filter 606, and is connected to an external receiving antenna 611 as well.

Figure 7:
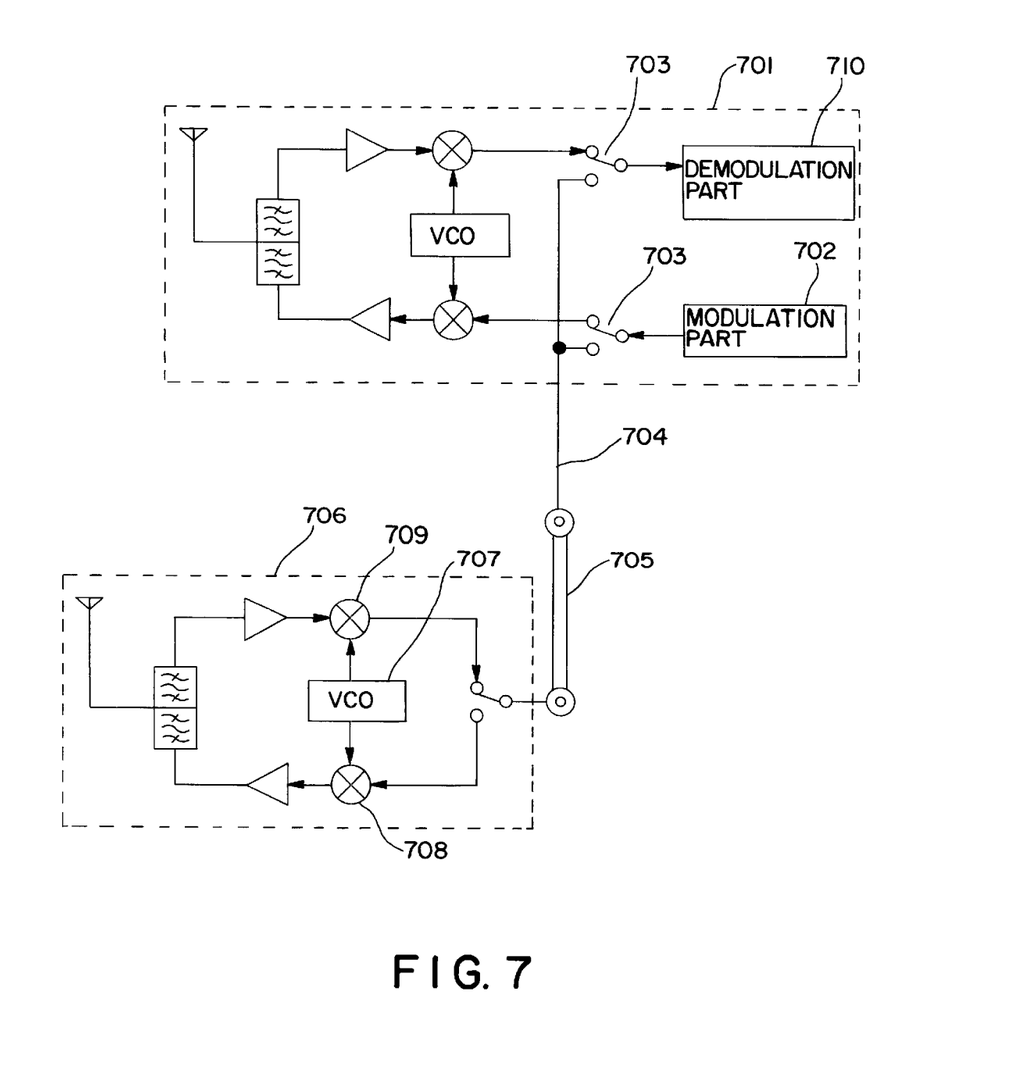
FIG. 7 is a block diagram showing a conventional portable cellular phone and a conventional external adapter for the conventional portable cellular phone.

Japanese Patent Application Laid-Open Gazette No. 5-347584 discloses a conventional portable cellular phone and an external adapter for a portable cellular phone. As shown in FIG. 7, a transmit signal which is modulated by a modulation part 702 in a portable cellular phone 701 is switched to an intermediate frequency signal line 704 by an intermediate frequency switch relay 703 and transmitted to an on-vehicle booster 706 through a coaxial cable 705, and the intermediate frequency transmit signal which is transmitted to the on-vehicle booster 706 is converted into a transmit frequency by a voltage control oscillator (VCO) 707 and a transmit mixer 708. A receive signal which is received by the on-vehicle booster 706 is converted into an intermediate frequency by the voltage control oscillator (VCO) 707 and a receive mixer 709, transmitted through the coaxial cable 705 and the intermediate frequency signal line 704, and switched to a demodulation part 710 by the intermediate frequency switch relay 703.

In the conventional portable cellular phone 601, where the external transmitting antenna 609 and the external receiving antenna 611 are used, a signal is transmitted and received through the transmit switch 608, which is disposed between the portable cellular phone transmitting antenna 604 and the portable cellular phone transmit filter 603, and the receive switch 610 which is disposed between the portable cellular phone receiving antenna 605 and the portable cellular phone receive filter 606.

However, since the transmit switch 608 is disposed after the portable cellular phone transmit amplifier 602 which uses a loss which is created at the transmit switch 608, an output power of the portable cellular phone transmit amplifier 602 must be high. Further, since the receive switch 610 is disposed before the portable cellular phone receive amplifier 607, a Noise Figure (NF) of a receiving system deteriorates. In a satellite communication system or the like which demands transmitting with a high output power and receiving with a high sensitivity, in particular, where the external transmitting antenna 609 and the external receiving antenna 611 are to be used, a high output power of the portable cellular phone transmit amplifier 602 and a low NF of a receiving system are a problem to be solved.

In addition, in the conventional portable cellular phone and an external adapter for the same, as shown in FIG. 7, the transmit signal is transmitted in the intermediate frequency band from the portable cellular phone 701 to the on-vehicle booster 706.

However, it is necessary to convert the transmit signal of the intermediate frequency band into the transmit frequency by the voltage control oscillator (VCO) 707 and the transmit mixer 708 which are disposed in the on-vehicle booster 706, which inconveniently increases the size of the on-vehicle booster.

SUMMARY OF THE INVENTION

The present invention, to solve the current problem as described above, aims at providing a portable cellular phone and an external adapter for the same, with which it is possible to suppress an increase in an output power of a portable cellular phone transmit amplifier due to a loss at a transmit switch associated with use of an external transmitting antenna, to reduce a deterioration of an NF of a receiving system due to a loss at a receive switch associated with use of an external receiving antenna, and to minimize an increase in the size of an external adapter.

A portable cellular phone according to a first aspect of the present invention comprises: a transmitting portion which includes a portable cellular phone transmit amplifier which amplifies a transmit signal and a transmit switch part which is disposed on the input side to the portable cellular phone transmit amplifier so as to switch whether to output the transmit signal to an external adapter or to the portable cellular phone transmit amplifier; and a receiving portion which includes a portable cellular phone receive amplifier which amplifies a receive signal and a receive switch part which is disposed on the output side to the portable cellular phone receive amplifier so as to switch between the receive signal which is amplified and the receive signal which is supplied from an external adapter.

A second aspect of the present invention is directed to a portable cellular phone external adapter which comprises: a transmit amplifier part which includes a transmit amplifier and a transmit filter, the transmit amplifier amplifying the transmit signal which is outputted to outside from the transmit switch part of the portable cellular phone, the transmit filter passing the transmit signal which is amplified; an external transmitting antenna for transmitting a signal which is outputted from the transmit amplifier part; an external receiving antenna; and a receive amplifier part which includes a receive amplifier and a receive filter, the receive amplifier amplifying the receive signal which is received by the external receiving antenna, the receive filter passing the receive signal which is amplified and supplying the receive signal to the receive switch part of the portable cellular phone.

A third aspect of the present invention is directed to a portable cellular phone apparatus which comprises: a portable cellular phone; and a portable cellular phone external adapter, wherein the transmit switch part of the portable cellular phone is connected to an input of the transmit amplifier of the portable cellular phone external adapter, and the receive switch part of the portable cellular phone is connected to an output of the receive amplifier of the portable cellular phone external adapter.

A further aspect of the present invention is directed to a portable cellular phone external adapter which comprises: a transmit amplifier part which amplifies the transmit signal which is outputted to outside from the transmit switch part of the portable cellular phone; a receive amplifier part which includes a receive amplifier and a duplexer, the receive amplifier amplifying the receive signal and outputting the amplified signal to the receive switch part of the portable cellular phone, the duplexer being connected with the output from the transmit amplifier part and an input to the receive amplifier; and an external transmitting/receiving antenna which is connected to the duplexer.

Another aspect of the present invention is directed to a portable cellular phone apparatus which comprises: a portable cellular phone; a transmit amplifier part which amplifies the transmit signal which is outputted to an external adapter from the transmit switch part of the portable cellular phone; a receive amplifier part which includes a receive amplifier and a duplexer, the receive amplifier amplifying the receive signal and outputting the amplified signal to the receive switch part of the portable cellular phone, the duplexer being connected with the output from the transmit amplifier part and an input to the receive amplifier; and an external transmitting/receiving antenna which is connected to the duplexer.

According to a still further aspect of the present invention, the transmit amplifier part is preferably disposed indoors, an output from the transmit amplifier part is connected via a cable to the duplexer of the receive amplifier part which is disposed in the vicinity of the external transmitting/receiving antenna which is disposed out of doors, and an output from the receive amplifier of the receive amplifier part is preferably connected via a cable to the receive switch part of the portable cellular phone.

According to further aspect of the present invention, in the portable cellular phone apparatus, the portable cellular phone preferably comprises an external adapter detector part which detects connection to the portable cellular phone external adapter, the transmit amplifier part and/or the receive amplifier part operates preferably in response to an external power source which is disposed separately from the portable cellular phone, and supply of power to the portable cellular phone transmit amplifier and the portable cellular phone receive amplifier is preferably stopped when the external adapter detector part detects connection to the portable cellular phone external adapter.

According to a further aspect of the present invention, in the portable cellular phone apparatus, supply of power to the receive amplifier part may be realized using a cable for receive signal.

According to another aspect of the present invention, in the portable cellular phone apparatus, the external power source preferably has a function of operating the portable cellular phone and charging up an internal power source which is disposed inside the portable cellular phone.

DESCRIPTION OF THE PREFERRED EMBODIMENTS

A portable cellular phone and an external adapter for the same according to the present invention are characterized in that the portable cellular phone and the external adapter are connected to each other through a transmit switch which is disposed before a portable cellular phone transmit amplifier of a transmitting portion and through a receive switch which is disposed after a portable cellular phone receive amplifier of a receiving portion.

In the following, preferred embodiments of a portable cellular phone and an external adapter for the same according to the present invention will be described with reference to the associated drawings.

<First Preferred Embodiment>

Figure 1:
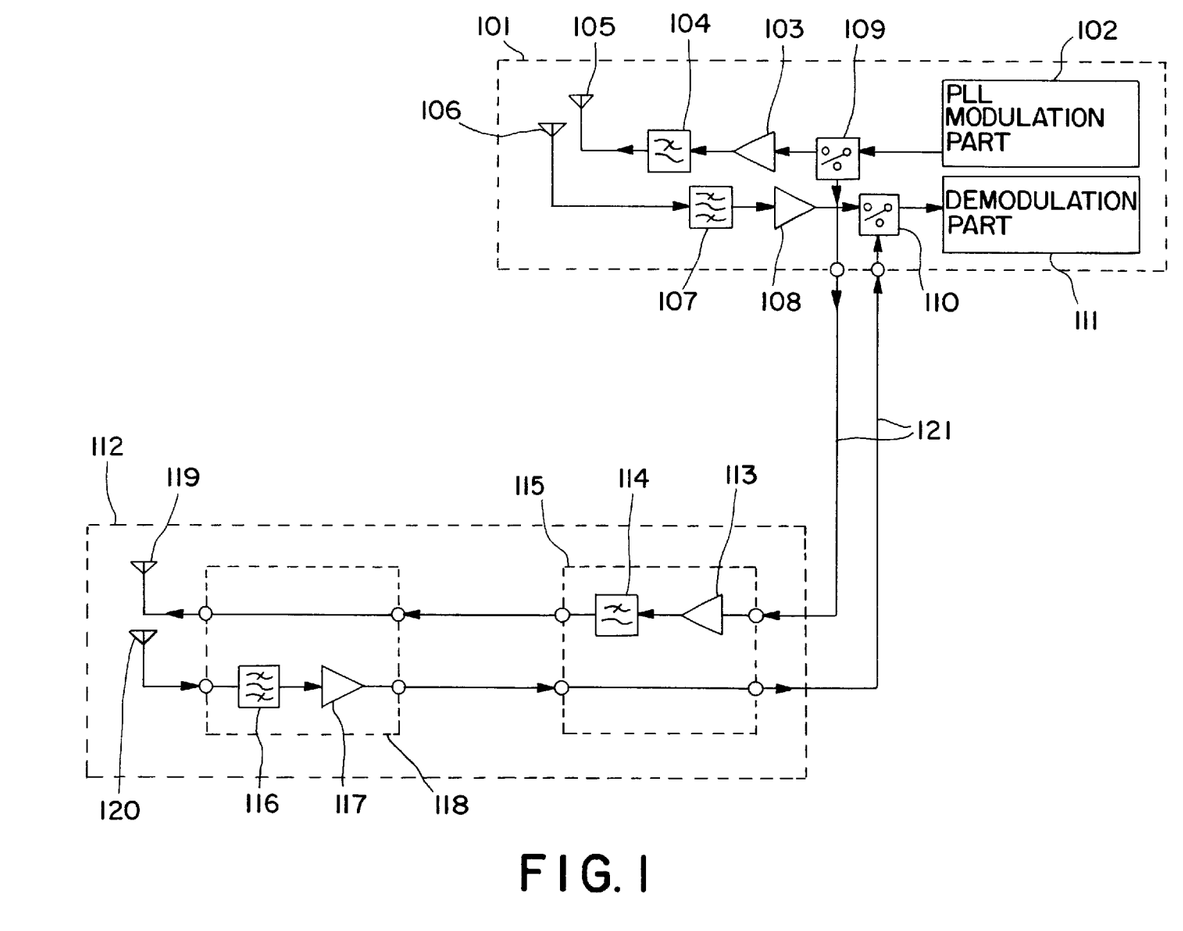
FIG. 1 is a block diagram showing a portable cellular phone and an external adapter for the same according to a first preferred embodiment of the present invention.

FIG. 1 is a block diagram showing a portable cellular phone and an external adapter for the same according to a first preferred embodiment of the present invention (An apparatus which comprises the both will be referred to as a portable cellular phone apparatus.). In FIG. 1, in a portable cellular phone 101, after a modulated signal of a transmit frequency which is modulated by a phase locked loop (PLL) modulation part 102 is amplified to a desired level by a portable cellular phone transmit amplifier 103, the signal is transmitted by a portable cellular phone transmitting antenna 105 through a portable cellular phone transmit filter 104, and a receive signal which is received by a portable cellular phone receiving antenna 106 is supplied, through a portable cellular phone receive filter 107, to a portable cellular phone receive amplifier 108 where the receive signal is amplified. Further, in the portable cellular phone 101, a transmit switch 109 is disposed on the input side to the portable cellular phone transmit amplifier 103, so as to switch whether to transmit the modulated signal of the transmit frequency to the portable cellular phone transmit amplifier 103 or to outside. Meanwhile, a receive switch 110 is disposed on the output side to the portable cellular phone receive amplifier 108, so as to switch whether to receive the receive signal at the portable cellular phone receive amplifier 108 or from the external adapter. The receive signal is thereafter supplied to a demodulation part 111 through the receive switch 110.

On the other hand, a portable cellular phone external adapter 112 comprises a transmit amplifier part 115 which is composed of a transmit amplifier 113 which amplifies the transmit frequency modulated signal and a transmit filter 114 which passes the transmit frequency modulated signal which belongs to a desired frequency band, a receive amplifier part 118 which is composed of a receive filter 116 which passes the receive signal belonging to a desired frequency band and a receive amplifier 117 which amplifies such a receive signal, an external transmitting antenna 119 which is connected to an output of the transmit amplifier part 115, and an external receiving antenna 120 which is connected to an input of the receive amplifier part 118. The portable cellular phone 101 and the portable cellular phone external adapter 112 are connected to each other via a cable 121.

The transmit switch 109 of the portable cellular phone 101 and the input of the transmit amplifier part 115 are connected to each other, the output of the transmit amplifier part 115 and the external transmitting antenna 119 are connected to each other, the receiving antenna 120 and the input of the receive amplifier part 118 are connected to each other, and the output of the receive amplifier part 118 and the receive switch 110 are connected to each other. As the transmit switch 109 changes over, the transmit frequency modulated signal is outputted to the portable cellular phone transmit amplifier 103 or to the transmit amplifier part 115 of the external adapter 112. As the receive switch 110 changes over, the receive signal is received by the portable cellular phone receive amplifier 108 or the receive amplifier part 118 of the external adapter 112.

Now, operations of the portable cellular phone and the portable cellular phone external adapter which are structured as described above will be described.

Figure 2:
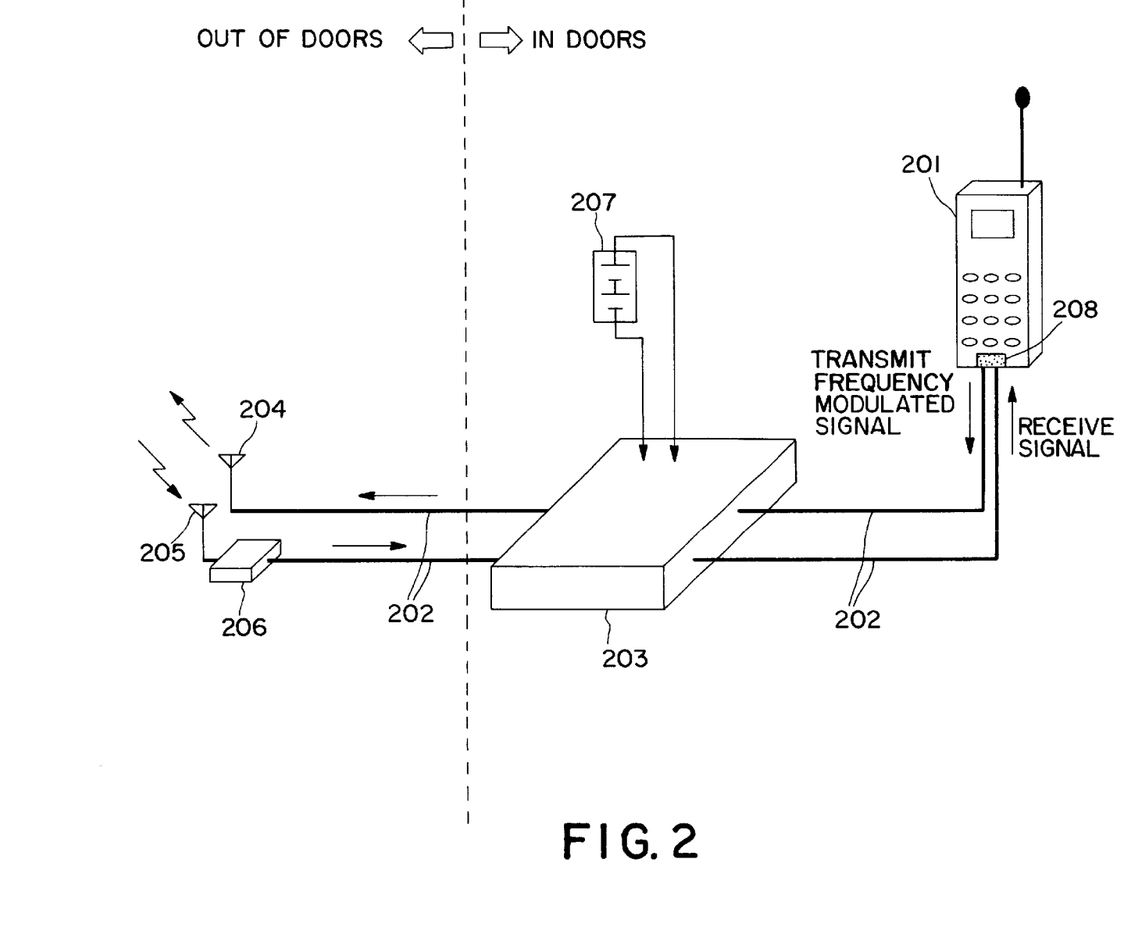
FIG. 2 is an appearance view showing an example of installation of the portable cellular phone and the portable cellular phone external adapter according to the first preferred embodiment.

FIG. 2 is an appearance view showing an example of installation of the portable cellular phone and the portable cellular phone external adapter described above according to the first preferred embodiment. In FIG. 2, the transmit frequency modulated signal from a portable cellular phone 201 is supplied via a cable 202 to a transmit amplifier part 203 which is disposed in doors. After amplified to a desired level, the signal is outputted from the transmit amplifier part 203. The output is radiated, through the cable 202, from an external transmitting antenna 204 which is disposed out of doors. Meanwhile, the receive signal which is received by a receiving antenna 205 which is disposed out of doors is amplified by a receive amplifier part 206 which is disposed immediately under the receiving antenna 205. An output from the receive amplifier part 206, passing through the transmit amplifier part 203 without amplified therein, enters the portable cellular phone 201 via the cable 202. As herein termed, "in doors" and "out of doors" are not limited respectively to inside a building and outside a building, but rather respectively may imply inside a car and outside a car in the case of an automobile or the like.

The transmit amplifier part 203 and the receive amplifier part 206 are operated by an external power source 207 which is disposed outside the portable cellular phone 201. At this stage, a detector part 208 within the portable cellular phone 201 detects connection to the portable cellular phone external adapter 112, upon which power sources of the portable cellular phone transmit amplifier 103 and the portable cellular phone receive amplifier 108 are turned off. Meanwhile, supply of power to the receive amplifier part 206 is attained by the cable 202 which is installed for the receive signal. In addition, the external power source 207 which is disposed outside the portable cellular phone 201 has a function of operating the portable cellular phone 201 and charging up an internal power source which is disposed inside the portable cellular phone 201. Supply of power from the external power source 207 to the portable cellular phone 201 may be realized by the cable 202 or a separate power source cable. The portable cellular phone 201, the transmit amplifier part 203 and the receive amplifier part 206 are similar in structure to the portable cellular phone 101, the transmit amplifier part 115 and the receive amplifier part 118, respectively, which are shown in FIG. 1.

Figure 3:
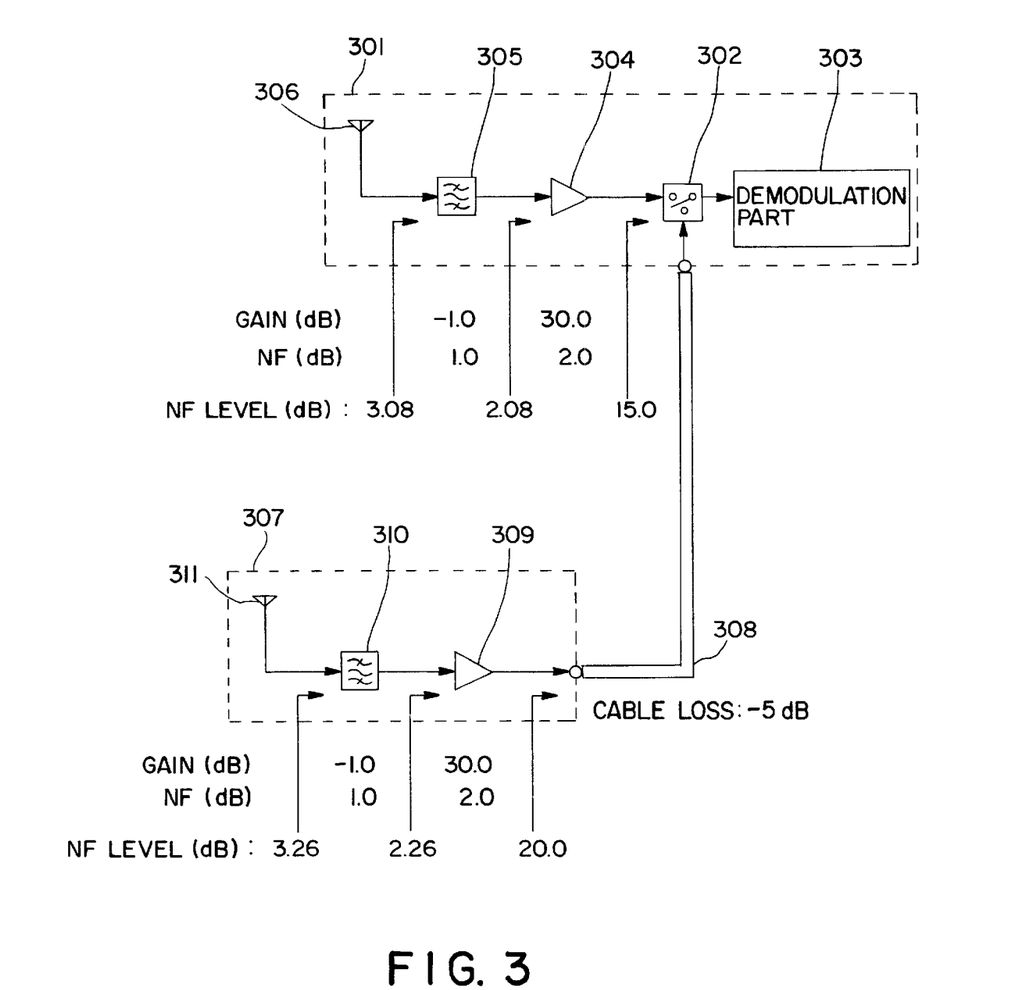
FIG. 3 is a diagram showing an NF level in a receiving system according to the present invention.

Further, with respect to the portable cellular phone and the external adapter for the same according to the present invention, as shown in FIG. 3, a noise factor (NF) level of a portable cellular phone 301 of a receiving system, on the demodulator side to a portable cellular phone receiving antenna 306, is calculated as 3.08 dB, where an NF from a receive switch 302 up to a demodulation part 303 is 15.0 dB, a gain and an NF of a portable cellular phone receive amplifier 304 are respectively 30 dB and 2.0 dB, and a loss of a portable cellular phone receive filter 305 is −1.0 dB. On the other hand, if a cable 308 which is disposed between the portable cellular phone 301 and a portable cellular phone external adapter 307 has a length of 5 m and a loss of −5.0 dB in a frequency band of 2 GHz, an NF at the cable 308, the receive switch 302 and the demodulation part 303 as viewed from an input terminal of a receive amplifier 309 is 20.0 dB. In this case, where a gain and an NF of the receive amplifier 309 are respectively 30 dB and 2.0 dB and a loss at a portable cellular phone receive filter 310 is −1.0 dB, an NF on the demodulator side to an external receiving antenna 311 is calculated as 3.26 dB. These NFs are calculated by the following equation:

$$NFi[\text{dB}] = 10\log\left[10^{\frac{NF_D[\text{dB}]}{10}} + \frac{10^{\frac{NF_O[\text{dB}]}{10}} - 1}{10^{\frac{G_D[\text{dB}]}{10}}}\right] \qquad \text{Eq. 1}$$

In general, a noise factor (NF) is expressed as a ratio of a signal to a noise at an input terminal or an output terminal of a device. Where a gain of the device is $G_D$ [dB], an NF of the device is $NF_D$ [dB] and an NF at a subsequent stage as viewed from the output side is $NF_o$ [dB], a noise factor $NF_i$ at the subsequent stage as viewed from the input side is expressed by Eq. 1. As described above, by means of the structures of the portable cellular phone and the external adapter for the same according to the present invention, even if the length of the cable 308, which is disposed between the portable cellular phone 301 and the portable cellular phone external adapter 307, is 5 m, a deterioration of an NF is suppressed to 0.18 dB. Meanwhile, as a high output power of a portable cellular phone transmit amplifier is not desirable to a transmitting system, a loss at a transmit switch is located at the input side to the portable cellular phone transmit amplifier, an output from the amplifier decreases an amount which is equivalent to the loss.

Having such structures as described above, the portable cellular phone and the external adapter for the same according to the present invention make it possible to suppress an increase in the output power of the portable cellular phone transmit amplifier due to a loss at the transmit switch associated with use of the external transmitting antenna, to reduce a deterioration of the NF of the receiving system due to a loss at the receive switch associated with use of the external receiving antenna, and to suppress an increase in the size of the external adapter.

As the portable cellular phone receive filter 107 and the receive filter 116, a band pass filter which attenuates a band which is outside a receive frequency band is used. Further, since the portable cellular phone 101 is constructed with the transmitting antenna 105 and the receiving antenna 106 separated from each other while the portable cellular phone external adapter 112 is constructed with the external transmitting antenna 119 and the external receiving antenna 120 separated from each other, a low pass filter which attenuates a harmonic wave is used as the portable cellular phone transmit filter 104 and the transmit filter 114. This creates a lower loss than a band pass filter, and hence, further suppresses a high output power of the portable cellular phone transmit amplifier 103 and the transmit amplifier 113.

In addition, although the first preferred embodiment requires that the transmit switch 109 is disposed immediately before the portable cellular phone transmit amplifier 103, the transmit switch 109 may be disposed at a further precedent stage as far as being on the input side to the portable cellular phone transmit amplifier 103 and staying within the transmit frequency band. Similarly, although the first preferred embodiment requires that the receive switch 110 is disposed immediately after the portable cellular phone receive amplifier 108, the receive switch 110 may be disposed at a further later stage as far as being on the output side to the portable cellular phone receive amplifier 108 and staying within the receive frequency band. In either structure, a similar effect to that of the present invention is created.

<Second Preferred Embodiment>

Figure 4:
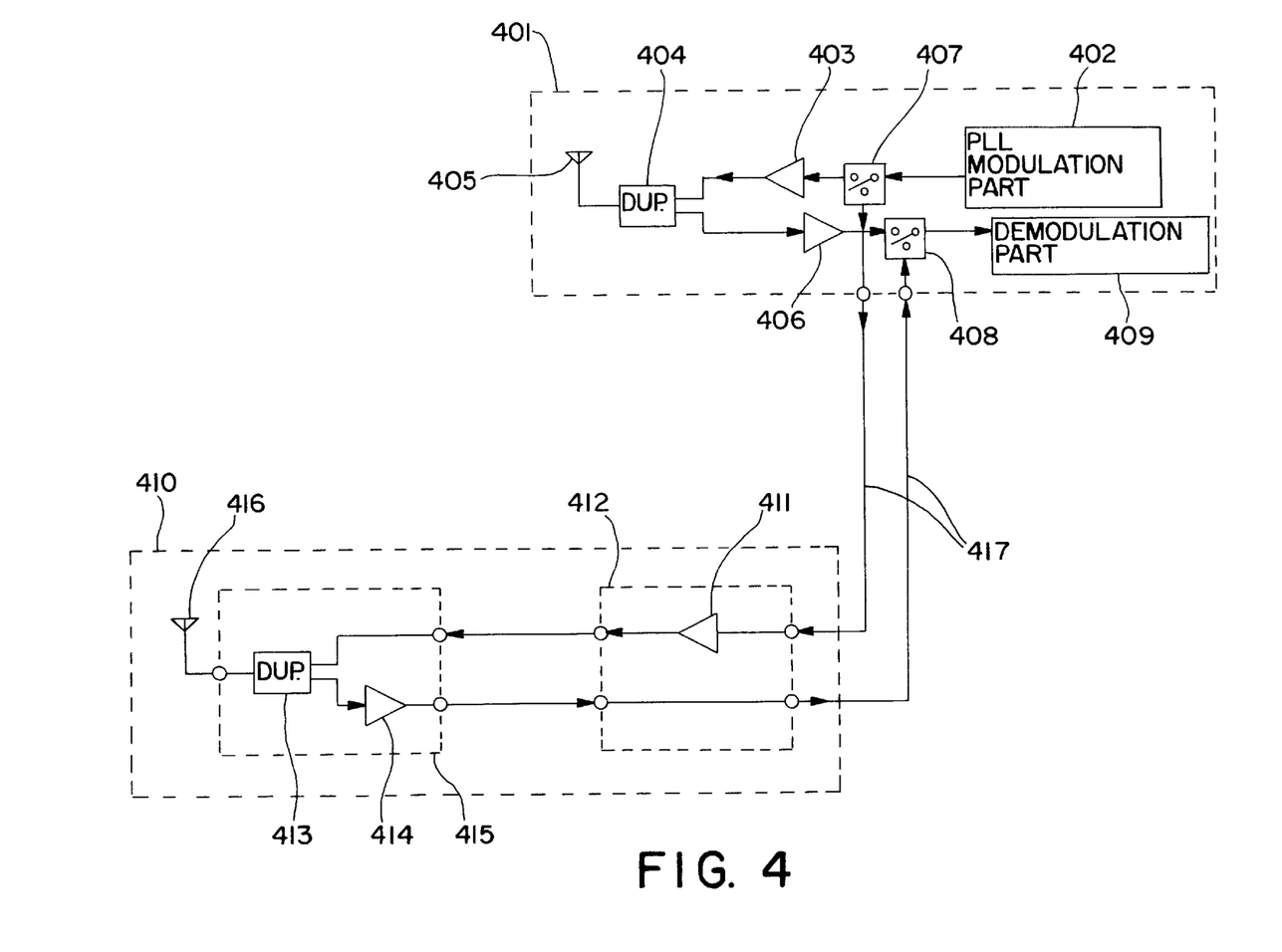
FIG. 4 is a block diagram showing a portable cellular phone and an external adapter for the same according to a second preferred embodiment of the present invention.

FIG. 4 is a block diagram showing a portable cellular phone and an external adapter for the same according to a second preferred embodiment of the present invention. In FIG. 4, in a portable cellular phone 401, after a modulated signal of a transmit frequency which is modulated by a PLL modulation part 402 is amplified to a desired level by a portable cellular phone transmit amplifier 403, the signal is transmitted by a portable cellular phone transmitting/receiving antenna 405 through a portable cellular phone duplexer 404, and a receive signal which is received by the portable cellular phone transmitting/receiving antenna 405 is supplied, through the portable cellular phone duplexer 404, to a portable cellular phone receive amplifier 406 where the receive signal is amplified. Further, in the portable cellular phone 401, a transmit switch 407 is disposed on the input side to the portable cellular phone transmit amplifier 403, so as to switch whether to transmit the modulated signal of the transmit frequency to the portable cellular phone transmit amplifier 403 or to the external adapter. Meanwhile, a receive switch 408 is disposed on the output side to the portable cellular phone receive amplifier 406, so as to switch whether to receive the receive signal at the portable cellular phone receive amplifier 406 or from outside. The receive signal is thereafter supplied to a demodulation part 409 through the receive switch 408.

On the other hand, a portable cellular phone external adapter 410 comprises a transmit amplifier part 412 which is formed by a transmit amplifier 411 which amplifies the transmit frequency modulated signal, a receive amplifier part 415 which is formed by a duplexer 413 and a receive amplifier 414 which amplifies the receive signal, and an external transmitting/receiving antenna 416. The portable cellular phone 401 and the portable cellular phone external adapter 410 are connected to each other via a cable 417.

The transmit switch 407 of the portable cellular phone 401 and an input of the transmit amplifier part 412 are connected to each other, an output of the transmit amplifier part 412 and the external transmitting/receiving antenna 416 are connected to each other through the duplexer 413 of an external adapter, the external transmitting/receiving antenna 416 and an input of the receive amplifier part 415 are connected to each other, and an output of the receive amplifier part 415 and the receive switch 408 are connected to each other through the transmit amplifier part 412. As the transmit switch 407 changes over, the transmit frequency modulated signal is outputted to the portable cellular phone transmit amplifier 403 or to the transmit amplifier part 412 of the external adapter 410. As the receives witch 408 changes over, the receive signal is received by the portable cellular phone receive amplifier 406 or the receive amplifier part 415 of the external adapter 410.

Figure 5A:
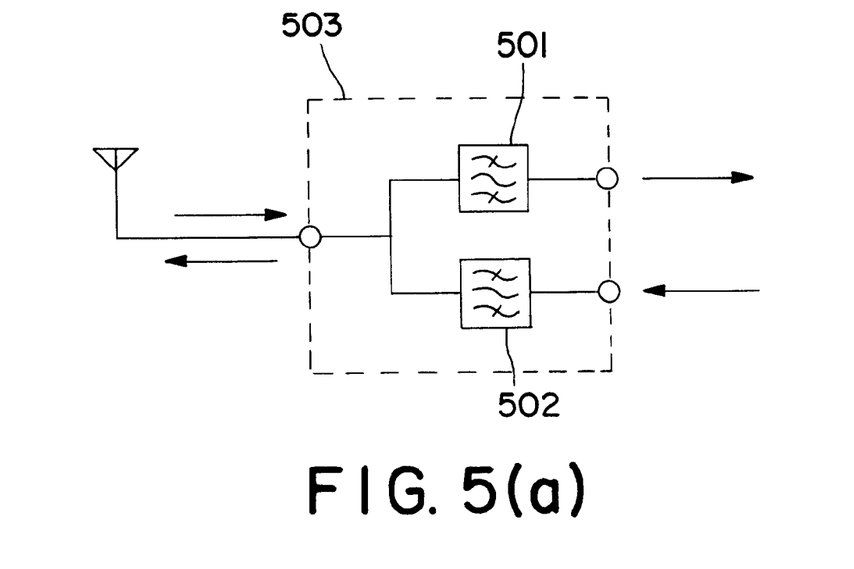
FIGS. 5(a) and 5(b) are block diagrams showing duplexers according to the second preferred embodiment.
Figure 5B:
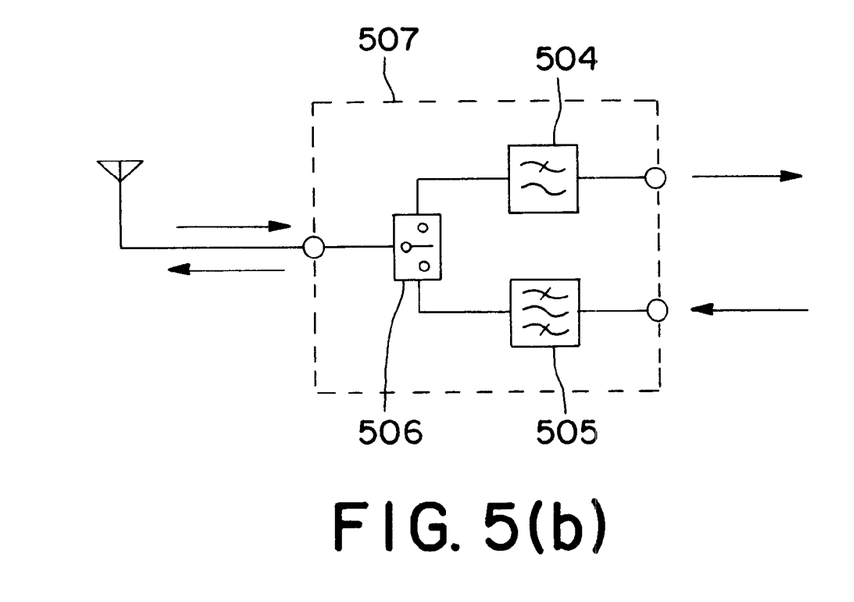

Operations of the portable cellular phone 401 and the portable cellular phone external adapter 410 are similar to those described earlier in relation to the first preferred embodiment. An external power source of the portable cellular phone 401 has a function of operating the portable cellular phone 401 and charging up an internal power source which is disposed inside the portable cellular phone 401, which is also similar to the first preferred embodiment. Further, the duplexers 404 and 413, as shown in FIG. 5(a), may be a duplexer 503 which is formed by a receive filter 501 and a transmit filter 502, or alternatively, may be a duplexer 507 which is formed by a receive filter 504, a transmit filter 505 and a transmit/receive switch 506 as shown in FIG. 5(b). While the receive filter 501 is a band pass filter and the transmit filter 502 is also a band pass filter in FIG. 5(a), the transmit filter 502 may be a band elimination filter. In addition, although the transmit filter 505 is a low pass filter and the receive filter 504 is a band pass filter in FIG. 5(b), the transmit filter 505 may be a band pass filter or a band elimination filter.

Having such structures as described above, the portable cellular phone and the external adapter for the same according to the present invention make it possible to suppress an increase in an output power of the portable cellular phone transmit amplifier due to a loss at the transmit switch associated with use of the external transmitting antenna, to reduce a deterioration of an NF of a receiving system due to a loss at the receive switch associated with use of the external receiving antenna, and to suppress an increase in the size of the external adapter.

As described above, the portable cellular phone according to the present invention has a structure which is comprised of the transmitting portion, in which the modulated signal of the transmit frequency which is modulated by the PLL modulation part is amplified to a desired level by the portable cellular phone transmit amplifier and transmitted by the antenna, and the receiving portion in which the receive signal which is received by the receiving antenna is amplified by the portable cellular phone receive amplifier. The transmit switch is disposed on the input side to the portable cellular phone transmit amplifier, so that the modulated signal of the transmit frequency is outputted through the transmit switch. The receive switch is disposed on the output side to the portable cellular phone receive amplifier of the receiving portion, so that the receive signal is inputted through the receive switch.

Further, the external adapter for the portable cellular phone comprises the transmit amplifier part which is formed by the transmit filter and the transmit amplifier which amplifies the transmit frequency modulated signal, the receive amplifier part which is formed by the receive filter and the receive amplifier which amplifies the receive signal, the external transmitting antenna, and the external receiving antenna. The transmit switch of the portable cellular phone and the input of the transmit amplifier part are connected to each other, the output of the transmit amplifier part and the external transmitting antenna are connected to each other, the external receiving antenna and the input of the receive amplifier part are connected to each other, and the output of the receive amplifier part and the receive switch of the portable cellular phone are connected to each other, and therefore, it is possible to suppress an increase in an output power of the portable cellular phone transmit amplifier due to a loss at the transmit switch associated with use of the external transmitting antenna, to reduce a deterioration of an NF of a receiving system due to a loss at the receive switch associated with use of the external receiving antenna, and to suppress an increase in the size of the external adapter, all of which is useful particularly to a satellite communication system or the like which demands transmitting with a high output power and receiving with a high sensitivity.

Further, if band pass filters are used as the transmit filter 502 and the receive filter 501 in the duplexer 503 while transmit/receive is switched by means of the transmit/receive switch 506 in the duplexer 507, a low pass filter may be used as the transmit filter 505, which creates a lower loss than a band pass filter, and hence, suppresses a high output power of the portable cellular phone transmit amplifier 403 and the transmit amplifier 411.

Further, the portable cellular phone transmitting antenna 105 and the portable cellular phone receiving antenna 106 of the portable cellular phone 101 of the first preferred embodiment may be replaced with the portable cellular phone transmitting/receiving antenna 405 as in the second preferred embodiment, and the portable cellular phone transmit filter 104 and the portable cellular phone receive filter 107 of the first preferred embodiment may be replaced with the portable cellular phone duplexer 404 as in the second preferred embodiment.

Conversely, the portable cellular phone transmitting/receiving antenna 405 of the second preferred embodiment may be replaced with the portable cellular phone transmitting antenna 105 and the portable cellular phone receiving antenna 106 as in the first preferred embodiment, and the portable cellular phone duplexer 404 of the second preferred embodiment may be replaced with the portable cellular phone transmit filter 104 and the portable cellular phone receive filter 107 as in the first preferred embodiment.

Further, the portable cellular phone transmit amplifiers 103 and 403 and the transmit amplifiers 113 and 411 of the first and the second preferred embodiments may have a ramping control function, in which case it is possible to adjust an output level.

With respect to the modulated signal of the transmit frequency which is outputted as an output signal from the PLL modulation part in the first and the second preferred embodiments, the transmit frequency modulated signal may be a transmit frequency modulated signal which is directly modulated, or alternatively, a transmit frequency modulated signal which is modulated at an intermediate frequency and thereafter converted through a mixer.

As clearly described in the foregoing, the present invention is advantageous in that it is possible to suppress an increase in an output power of the portable cellular phone transmit amplifier due to a loss at the transmit switch associated with use of the external transmitting antenna, to reduce a deterioration of an NF of a receiving system due to a loss at the receive switch associated with use of the external receiving antenna, and to suppress an increase in the size of the external adapter.

What is claimed is:

1. A portable cellular phone external adapter, comprising:
    a transmit amplifier part which includes a transmit amplifier and a transmit filter, said transmit amplifier amplifying a transmit signal which is received from a transmit switch part of a portable cellular phone, said transmit filter passing said transmit signal which is amplified;
    an external transmitting antenna for transmitting a signal which is outputted from said transmit amplifier part;
    an external receiving antenna separate from the external transmitting antenna for providing a receive signal; and
    an external receive amplifier part which includes a receive amplifier and a receive filter, said receive amplifier amplifying said receive signal which is received from said external receiving antenna, said receive filter passing said receive signal which is amplified and supplying said receive signal to a receive switch part of said portable cellular phone,
    wherein said external receiving antenna is disposed out of doors, in that said external receiving antenna is not housed within a confined structure; and
    said portable cellular phone comprises a transmitting portion which includes a portable cellular phone transmit amplifier which amplifies said transmit signal and said transmit switch part which is disposed on an input side of said portable cellular phone transmit amplifier for switching said transmit signal to one of said external adapter and said portable cellular phone transmit amplifier; and
    a receiving portion which includes a portable cellular phone receive amplifier which amplifies a receive signal and a receive switch part which is disposed on an output side of said portable cellular phone receive amplifier to switch between said receive signal which is amplified and a said receive signal which is supplied from the external adapter.

2. The portable cellular phone external adapter of claim 1, wherein said transmit signal is a modulated signal which belongs to a transmit frequency band, and said receive signal is a modulated signal which belongs to a receive frequency band.

3. The portable cellular phone external adapter of claim 2, wherein said transmit signal is a modulated signal which belongs to a transmit frequency band which is modulated by a phase locked loop modulation method.

4. A portable cellular phone apparatus including a portable cellular phone and a portable cellular phone external adapter, the portable cellular phone external adapter comprising:
    a transmit amplifier part including a transmit amplifier coupled to said transmit switch part of said portable cellular phone for amplifying said transmit signal and a transmit signal and a transmit filter for filtering said amplified transmit signal received from said transmit amplifier of said transmit amplifier part and providing a transmit amplifier part output signal;
    an external transmitting antenna for transmitting said transmit amplifier part output signal;
    an external receiving antenna for receiving a receive signal; and
    an external receive amplifier part including a receive amplifier for amplifying said receive signal received by said external receiving antenna and a receive filter for filtering said receive signal amplified by said receive amplifier and providing said amplified and filtered receive signal to said receive switch part of said portable cellular phone,
    wherein said external receiving antenna is disposed out of doors in that said external receiving antenna is not housed within a confined structure; and
    said portable cellular phone comprises a transmitting portion which includes a portable cellular phone transmit amplifier which amplifies a transmit signal and a transmit switch part which is disposed on an input side of said portable cellular phone transmit amplifier for switching said transmit signal to one of said external adapter and said portable cellular phone transmit amplifier; and
    a receiving portion which includes a portable cellular phone receive amplifier which amplifies a receive signal and a receive switch part which is disposed on an output side of said portable cellular phone receive amplifier to switch between said receive signal which is amplified and a receive signal which is supplied from the external adapter.

5. The cellular phone of any one of claim 1 and 4 wherein said receive amplifier part is disposed out of doors.

6. The cellular phone of any one of claim 1 and 4 wherein said receive amplifier part is disposed out of doors and said transmit amplifier part is disposed indoors, in that the indoors comprises a confined structure and the out of doors is not the confined structure.

7. The portable cellular phone apparatus of claim 4, wherein said transmit signal is a modulated signal which belongs to a transmit frequency band, and said receive signal is a modulated signal which belongs to a receive frequency band.

8. The portable cellular phone apparatus of claim 7, wherein said transmit signal is a modulated signal which belongs to a transmit frequency band which is modulated by a phase locked loop modulation method.

9. The portable cellular phone apparatus of claim 4, wherein said transmit amplifier part of the external adapter is disposed in doors, an output from said transmit amplifier part is connected via a cable to said external transmitting antenna which is disposed out of doors, and an output from said external receive amplifier part is connected via a cable to said portable cellular phone.

10. The portable cellular phone apparatus of claim 9, wherein said portable cellular phone comprises an external adapter detector part which detects connection to said portable cellular phone external adapter, said transmit amplifier part and/or said receive amplifier part operates in response to an external power source which is disposed separately from said portable cellular phone, and supply of power to said portable cellular phone transmit amplifier and said portable cellular phone receive amplifier is stopped when said external adapter detector part detects connection to said portable cellular phone external adapter.

11. The portable cellular phone apparatus of claim 10, wherein supply of power to said receive amplifier part is realized using a cable for receive signal.

12. The portable cellular phone apparatus of claim 11, wherein said external power source has a function of operating said portable cellular phone and charging up a portable cellular phone internal battery which is disposed inside said portable cellular phone.

13. A portable cellular phone, comprising:
  (a) a transmitting portion including:
    a modulator house within a first housing of the cellular phone for providing a transmit signal modulated at a transmit frequency,
    a first transmit amplifier disposed within the first housing of the cellular phone,
    a second transmit amplifier within a second housing disposed indoors, in that said doors comprises a confined structure,
    a transmitting antenna coupled to the second transmit amplifier, the transmitting antenna disposed out of doors and not within the confined structure, and
    a transmit switch housed within the first housing of the cellular phone for selectively coupling the transmit signal to one of the first transmit amplifier and the second transmit amplifier,
    wherein when the transmit switch is selectively coupled to the second transmit amplifier, the transmit signal is amplified by the second transmit amplifier and transmitted by the transmitting antenna;
  (b) a receiving portion including:
    a first receive amplifier disposed within the first housing of the cellular phone for receiving a receive signal and providing a first amplified receive signal,
    a receiving antenna disposed out of doors, and the receiving antenna being separate and disposed apart from the transmitting antenna,
    a second receive amplifier within a third housing disposed out of doors for receiving a receive signal from the receiving antenna and providing a second amplified receive signal, the third housing being separate and apart from the first and second housing,
    a receive switch housed within the first housing of the cellular phone for selectively coupling to one of the first receive amplifier and the second receive amplifier,
    wherein when the receive switch is selectively coupled to the second receive amplifier, the receive signal is received by the receive antenna and amplified by the second receive amplifier to provide the second amplified receive signal only from the out of doors into the indoors,
    wherein only the second amplified receive signal is sent indoors to minimize interference with said amplified transmit signal, and
    wherein the second receive amplifier within the third housing is disposed immediately at the external receiving antenna.

14. A portable cellular phone external adapter, comprising:
  a transmit amplifier part which includes a transmit amplifier and a transmit filter, said transmit amplifier amplifying a transmit signal which is received from a transmit switch part of a portable cellular phone, said transmit filter passing said transmit signal which is amplified;
  an external antenna for transmitting a signal which is outputted from said transmit amplifier part and for providing a receive signal; and
  an external receive amplifier part which includes a receive amplifier and a receive filter, said receive amplifier amplifying said receive signal which is received from said external antenna, said receive filter passing said receive signal which is amplified and supplying said receive signal to a receive switch part of said portable cellular phone,
  wherein said external receive amplifier part is disposed out of doors and immediately at said external antenna; and
  said portable cellular phone comprises a transmitting portion which includes a portable cellular phone transmit amplifier which amplifies said transmit signal and said transmit switch part which is disposed on an input side of said portable cellular phone transmit amplifier for selectively switching said transmit signal to said external adapter at one time and said portable cellular phone transmit amplifier at another time; and
  a receiving portion which includes a portable cellular phone receive amplifier which amplifies a receive signal and a receive switch part which is disposed on an output side of said portable cellular phone receive amplifier for selectively switching between said receive signal from the portable cellular phone receive amplifier at one time and a receive signal which is supplied from the external adapter at another time.

15. A portable cellular phone, comprising:
  a transmitting portion which includes a portable cellular phone transmit amplifier which amplifies a transmit signal and a transmit switch part which is disposed on an input side to said portable cellular phone transmit amplifier for switching to output said transmit signal to an external device or to said portable cellular phone transmit amplifier; and a receiving portion which includes a portable cellular phone receive amplifier which amplifies a receive signal and a receive switch part which is disposed on an output side to said portable cellular phone receiver amplifier for switching between said receive signal which is amplified and said receive signal which is supplied from an external device;

wherein said transmit switch part and said receive part are single pole double throw types, the transmit switch part selectively couples the transmit signal to the portable cellular phone transmit amplifier at one time and the external device at another time, and the receive switch part selectively couples the receive signal from the portable cellular phone receive amplifier at one time and the receive signal from the external device at another time.

16. The portable cellular phone of claim 15 wherein a low pass filter is included on an output side of said transmit amplifier, and a bandpass filter is included on an input side of said receive amplifier.

17. A portable cellular phone, comprising:

a transmitting portion which includes a portable cellular phone transmit amplifier which amplifies a transmit signal and a transmit switch part which is disposed on an input side to said portable cellular phone transmit amplifier for switching to output said transmit signal to an external device or to said portable cellular phone transmit amplifier;

a receiving portion which includes a portable cellular phone receive amplifier which amplifies a receive signal and a receive switch part which is disposed on an output side to said portable cellular phone receive amplifier for switching between said receive signal which is amplified and said receive signal which is supplied from an external device; and an external adapter detector part which detects connection to said external device;

wherein supply of power to said portable cellular phone transmit amplifier and said portable cellular phone receive amplifier is stopped when said external adapter detector part detects connection to said external device, and the respective input and output sides of the portable cellular phone transmit and receive amplifiers are respectively isolated from the transmit and receive signals respectively.

18. The portable cellular phone of claim 17, further comprising:

an external power source for charging up a portable cellular phone internal battery which is disposed inside said portable cellular phone.

19. The portable cellular phone of claim 18 wherein the external power source charges the portable cellular phone internal battery on a cable carrying the transmit and receive signals to and from the external device, respectively.

* * * * *

UNITED STATES PATENT AND TRADEMARK OFFICE
CERTIFICATE OF CORRECTION

PATENT NO.     : 6,459,915 B2
DATED          : October 1, 2002
INVENTOR(S)    : Nakamura et al.

It is certified that error appears in the above-identified patent and that said Letters Patent is hereby corrected as shown below:

<u>Title page,</u>
Item [30], Foreign Application Priority Data, "Sep. 2, 1997 (JP) 9-264548" should read -- Sep. 29, 1997 (JP) 9-264548 --.

<u>Column 11,</u>
Line 41, "house" should read -- housed --.

Signed and Sealed this

Twenty-seventh Day of May, 2003

JAMES E. ROGAN
*Director of the United States Patent and Trademark Office*